(12) United States Patent
Kuhn

(10) Patent No.: US 7,125,231 B1
(45) Date of Patent: Oct. 24, 2006

(54) CAM PIN/SLIDE ACTUATION FOR TWO-SHOT INJECTION MOLD

(75) Inventor: Todd Kuhn, Scottsdale, AZ (US)

(73) Assignee: The Tech Group, Inc., Scottsdale, AZ (US)

( * ) Notice: Subject to any disclaimer, the term of this patent is extended or adjusted under 35 U.S.C. 154(b) by 0 days.

(21) Appl. No.: 11/223,478

(22) Filed: Sep. 8, 2005

(51) Int. Cl.
*B29C 45/16* (2006.01)

(52) U.S. Cl. ............... 425/130; 425/576; 425/DIG. 5; 425/DIG. 58

(58) Field of Classification Search .......... 425/130, 425/576, DIG. 5, DIG. 58
See application file for complete search history.

(56) References Cited

U.S. PATENT DOCUMENTS

| | | |
|---|---|---|
| 3,811,654 A | 5/1974 | Castoe |
| 4,515,342 A | 5/1985 | Boskovic |
| 4,765,585 A | 8/1988 | Wieder |
| 4,768,747 A | 9/1988 | Williams |
| 5,234,329 A | 8/1993 | Vandenberg |
| 5,312,243 A | 5/1994 | Mertz |
| 5,407,344 A | 4/1995 | Rombalski |
| 6,116,891 A | 9/2000 | Starkey |
| 6,126,429 A | 10/2000 | Burger |
| 6,443,723 B1 | 9/2002 | Buttigieg |
| 6,783,346 B1 * | 8/2004 | Bodmer et al. ............. 425/112 |

* cited by examiner

*Primary Examiner*—Tim Heitbrink
(74) *Attorney, Agent, or Firm*—Akin Gump Strauss Hauer & Feld, LLP

(57) ABSTRACT

A two-shot injection mold employs a cam pin/slide actuation to open and close the mold, and is configured to leave the mold closed after the first shot and to open it only after the second shot, employing open-topped cam slide channels and two different cam pin configurations to effect the operation.

17 Claims, 7 Drawing Sheets

CAM PIN/SLIDE ACTUATION FOR TWO-SHOT INJECTION MOLD

BACKGROUND

This invention relates to two-shot injection molds employing cam/slide actuation to open and close the mold.

DETAILED DESCRIPTION

Figure 1:
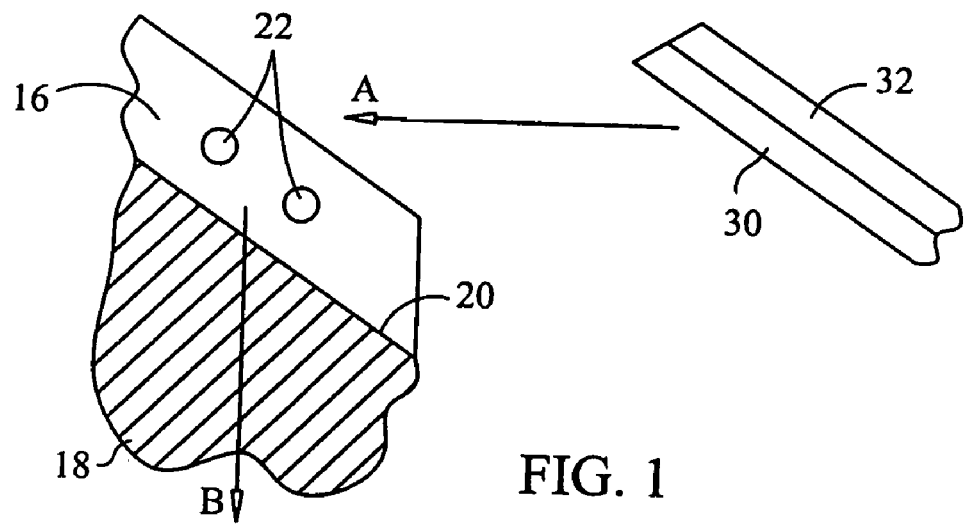
FIG. 1 is a diagrammatic representation of an embodiment of the invention.

Reference now should be made to the drawings, wherein the same reference numbers are used throughout the different figures to designate the same or similar components. Before entering into a description of the embodiment shown in the drawings, however, it should be noted that the embodiment which is illustrated is particularly useful in conjunction with two-shot injection molds having a rotating central part, which spins or rotates 180° between each shot.

Two-shot molding is used to produce a large number of parts where a first type of plastic (or a plastic in a first color) is first shot into one-half of the mold. The mold then is rotated or moved to another position to mate with a different second half of the mold while the first half part remains in the cavity. The second shot of plastic then is formed in this second half of the mold, adjacent the plastic of the first shot. After the second shot, the part is ejected from the mold and the process is continued.

Many two-shot molds operate with a rotating central mold section, which spins or rotates 180° between each shot. This part then closes the back-and-forth moving section of the mold for each of the two different shots in the two halves of the rotating part. Consequently, once operation is underway, each cycle of the mold injects both plastics (the first into the left-hand side for example, and the second into the right-hand side, for example). The mold then is opened; and the parts which have received the second shot formed in them are ejected from the mold. The central section then rotates 180° again to present the empty cavity to the side for the molding of the first part, simultaneously, with the injection of the second plastic into the second half of the mold; and the cycle continues repeatedly.

In typical two-shot molds using a central rotating section, when the mold opens to allow the spinning or rotation of the central section to present the two different halves to the primary reciprocal parts of the mold, the parts which have been formed in the first shot generally are exposed, and typically are held in place by an undercut for those parts. When the mold closes again, the steel for the cavity slides past the first molded part to then use that part in conjunction with other internal configurations of the cavity for the mold to form the second part. There always is a danger of a slight misalignment, which can cause marring or damaging of the first molded part during such an operation.

The embodiment of the invention which is illustrated in FIGS. 1 through 9 is directed to a two-shot mold having a rotating central section of the general type described above. In the embodiment which is disclosed in FIGS. 1 through 9, however, the mold cavity for the first part in the rotating section is held closed after formation of the first part, while simultaneously opening the cavity for the second part, to allow the ejection of finished components.

When the second cavity is opened, the mold sections additionally are separated to a position which allows rotation of the central section of the mold. By keeping the cavity closed for the first part, when the central section is rotated from the injection of the first part to the position where the second injection is to take place, the molding of the first part is allowed to take place without an undercut (if desired); and further, such an operation prevents the potential for scratching of the molded first parts by the moving parts of the main mold.

In molds of the type which are generally described above, the mold sections move toward and away from one another in the direction of the axis of rotation of the central or rotating mold section. The cavities which are opened and closed can be carried either in the rotating part of the section, or in the non-rotating section, and include, as part of the mold cavities, reciprocating slides which move in a direction perpendicular to the axis of rotation of the central mold section. This sliding action is effected by the use of angled slide pins, such as the slide pins 30/32 and 40, shown most clearly in FIGS. 3 and 4, respectively.

Figure 5:
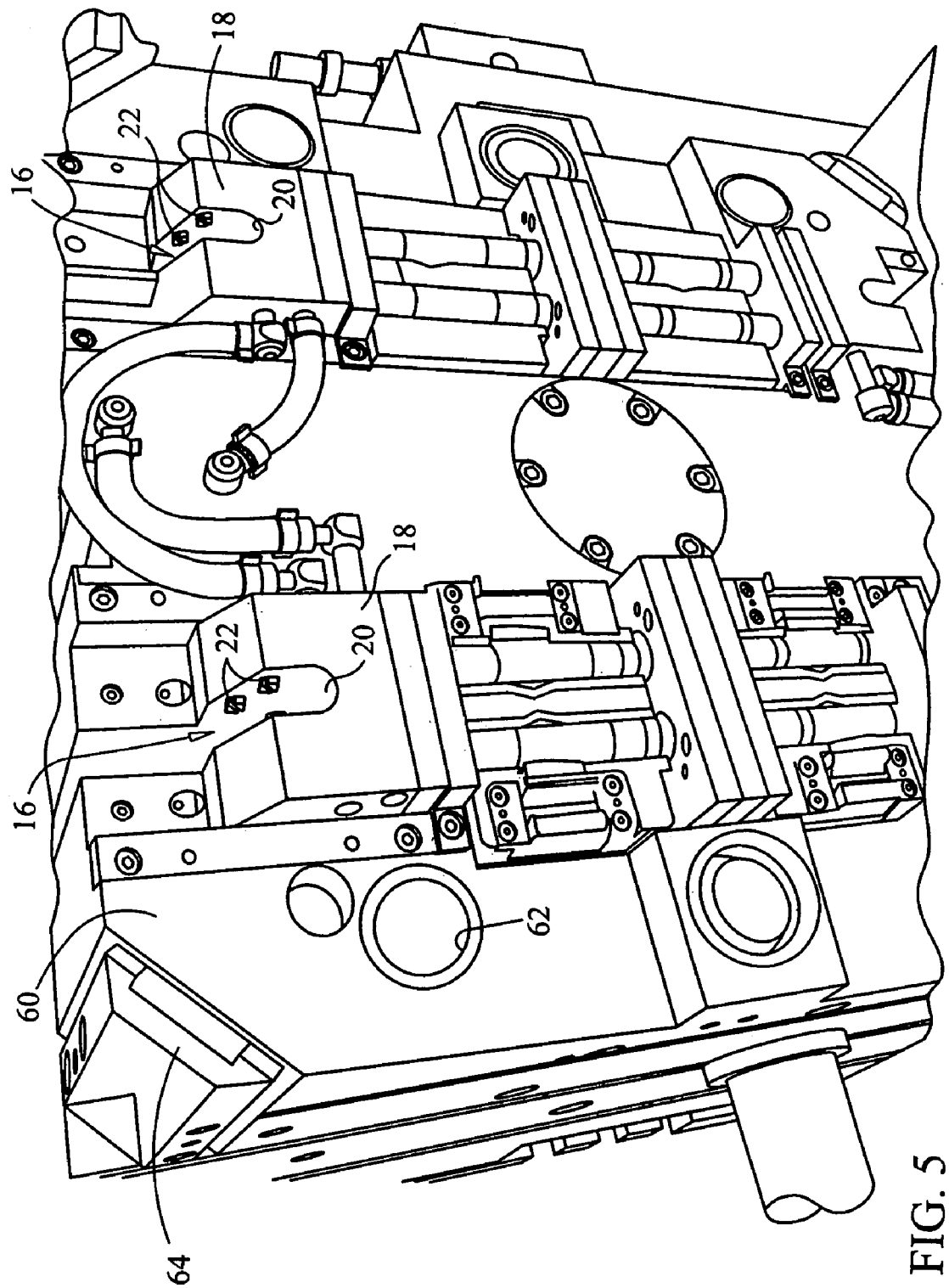
FIG. 5 is a diagrammatic representation of a portion of an embodiment of the invention.
Figure 6:
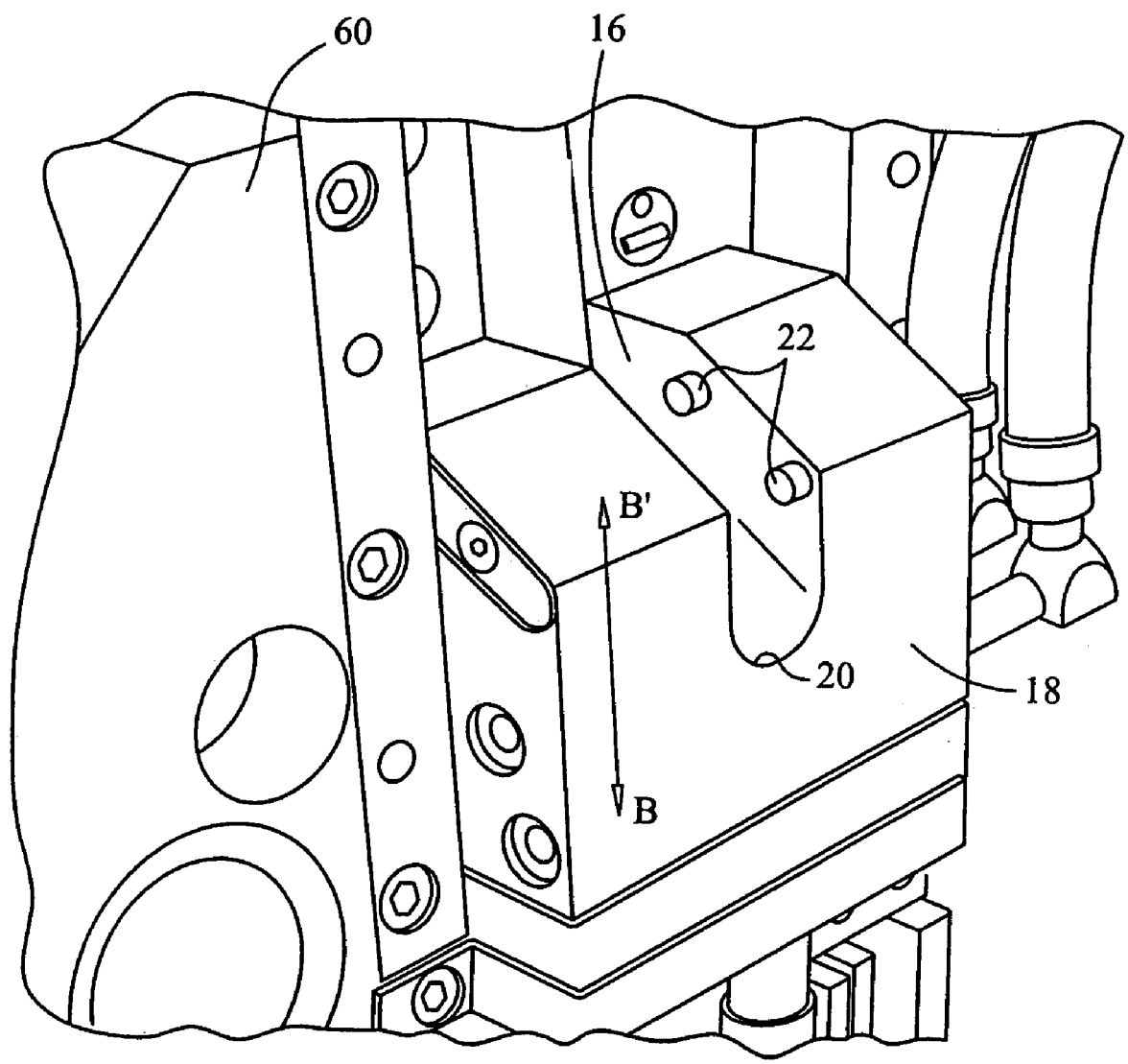
FIG. 6 is an enlarged detail of a portion of the embodiment shown in FIG. 5.
Figure 7:
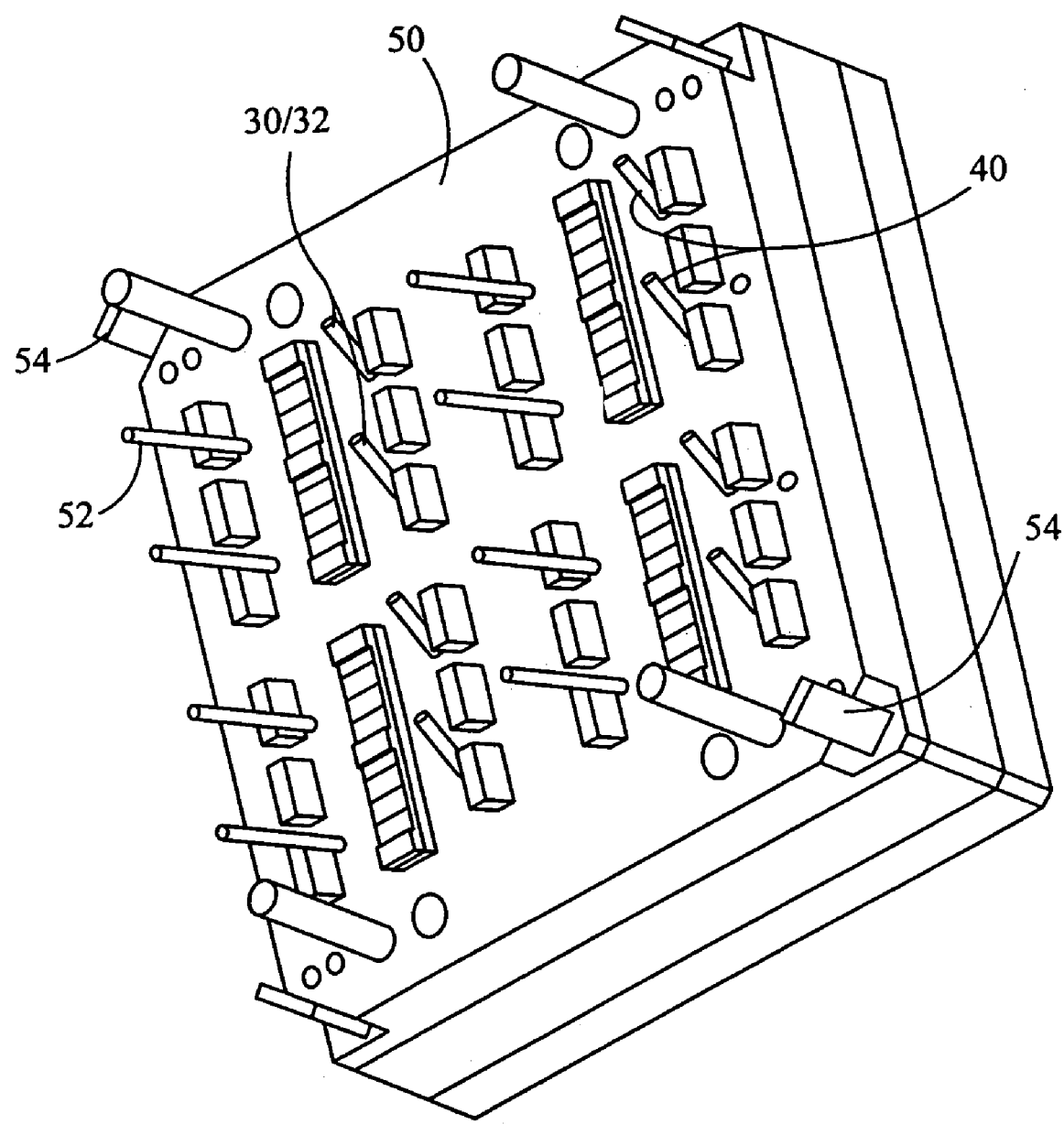
FIG. 7 is another portion of an embodiment of the invention which operates in cooperation with the parts shown in FIGS. 5 and 6.

FIGS. 1 and 2A through 2C are diagrammatic representations of the manner of operation of the sliding part 18 of the mold in conjunction with the movement of the slide pins (as shown in FIGS. 6 and 7), carried on the non-rotating section 50 of the mold. Each slide pin 30/32 has a generally inverted T-shaped cross-sectional configuration, shown most clearly in FIG. 3, with the leg 32 extending upwardly from the wider T-shaped portion 32. The pin 30/32 is centered in a channel 16 on an angled slide 20, located in a sliding part 18 on the central or rotating mold section cavity as shown most clearly in the detailed drawings of FIGS. 5 and 6. The bottom of the channels 16 for all of the different sliding mold parts 18 are sloped or angled; and this bottom is shown as the bottom 20 in FIGS. 1,2,3,4,5 and 6.

FIGS. 1 and 2*a*, 2*b*, and 2*c* illustrate diagrammatically the operation which takes place, as the rotating mold section 60 is relatively moved toward and away from the fixed mold section 50. FIG. 1 shows the relative positions of the angled pin 30/32 and the movable slide part 18 with the mating angled bottom 20 in the channel 16 when the mold parts 50 and 60 are separated. As shown by the directional arrow A in FIG. 1, when the mold is closed, the angled pin 30/32 is moved toward the open-topped channel 16 in the slide part 18, with the wider bottom portion 30 of the "T" engaging spring loaded cam pins 22, which extend into the channel 16 from opposite sides, as shown in FIGS. 1,2,3 and 4.

Figure 3:
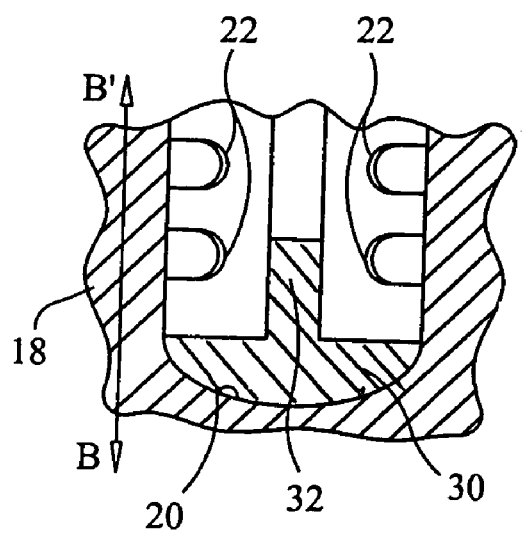
FIGS. 3 and 4 illustrate details of an embodiment of the invention.

The rounded bottom of the pin 30/32 engages the slightly rounded edges of the cam pins 22, causing the cams 22 to retract into pockets (not shown) in the side walls of the channels 16 whenever the mold parts move together to the fully closed position. Because of the rounded configuration of the bottom of the pin 30, the pin 30 moves completely past the spring loaded cam pins 22 and engages the bottom 20 of the channel 16, as shown in FIG. 3. The cam pins 22 then snap back to their fully extended position under the urging of springs (not shown) with the flat surface of the top of the T-shaped cam section 30 then located beneath the cam pins 22, as shown most clearly in FIG. 2A.

Once the mold cavity is fully closed, molten mold material (typically, some type of plastic) is introduced into the mold cavity (not shown) in a suitable manner, to form the finished molded part. The cam pin 30/32 is used on the mold half which receives the second shot of plastic or other mold material, as described above; so that after this second shot of the molded part has been cured, the mold is opened by moving the parts 50 and 60 away from one another. This causes the cam pin 30/32 to move toward the right relative to the slide part 18, as shown in the cross-sectional view of FIG. 2A. In this figure, the cross section has been taken past the upright central portion 32, which passes freely between the spring loaded cam pins 22 (as is readily apparent from FIG. 3).

Figure 2A:
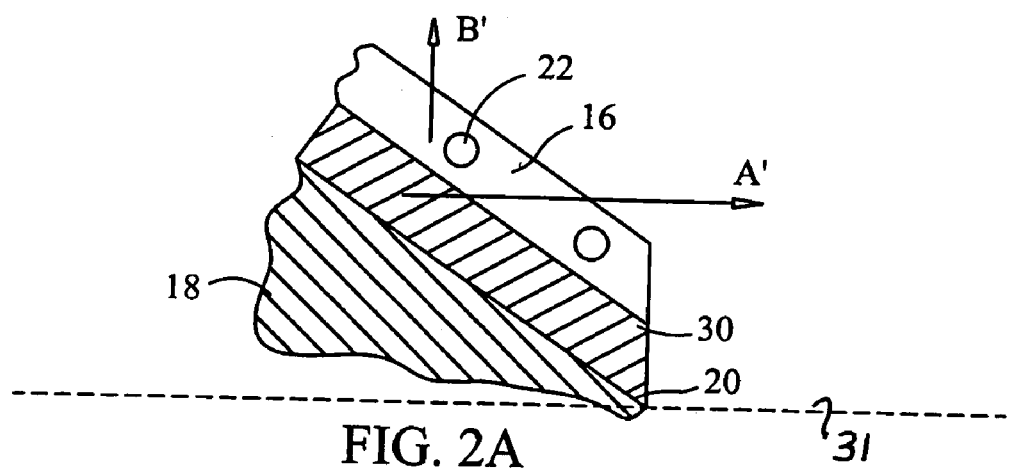
FIGS. 2A, 2B and 2C illustrate different stages of operation of the embodiment shown FIG. 1.
Figure 2B:
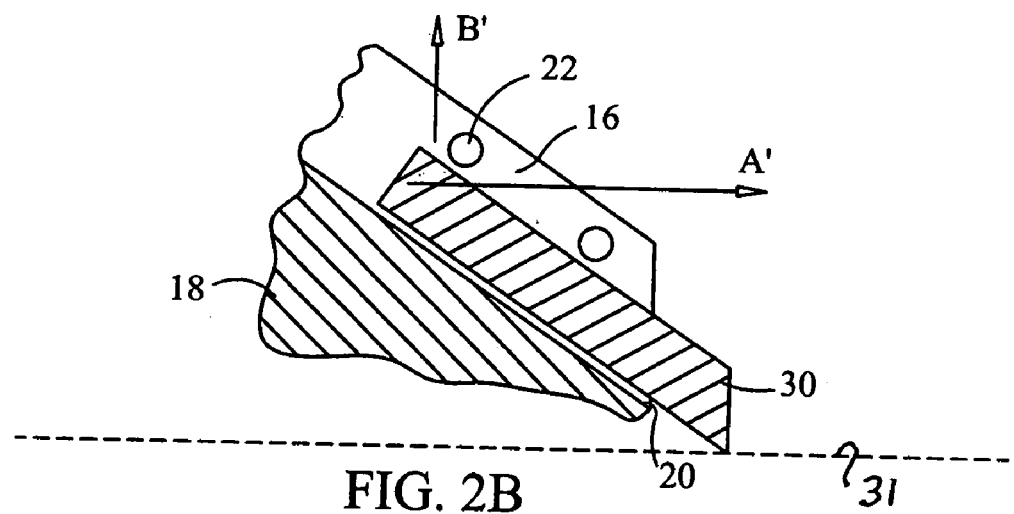
Figure 2C:
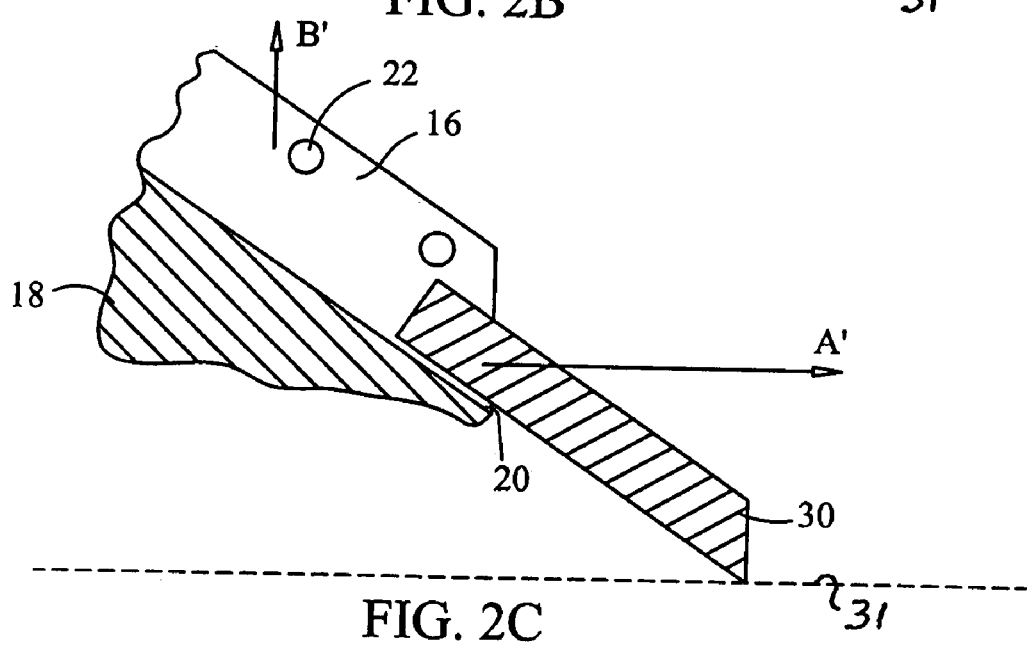

As the parts move apart as shown by the direction A' in FIG. 2A, the flat top surface of the portion 30 of the cam pin 30/32 engages the underside of the spring loaded cam pins 22, as illustrated in FIG. 2B. This causes the slide portion 18 of the mold to move upwardly on confining rails (again, not shown since these are commonly used) in the direction of the arrow B' shown in FIG. 2B. Continued movement of the cam pin 30/32 to the right, as shown in FIGS. 2A through 2C, causes the top surface of the end of the section 30 finally to clear the lowermost one of the spring loaded cam pins 22, as shown in FIG. 2C. This is the uppermost relative position of the movable slide part 18, as shown in FIG. 2C. The reference line 31 in FIGS. 2A, 2B and 2C, shows the relative vertical movement of the slide part 18 in the direction of the arrow B' which takes place from the initial movement of the mold parts 50 and 68 away from one another, to the final position as shown in FIG. 2C.

Figure 9:
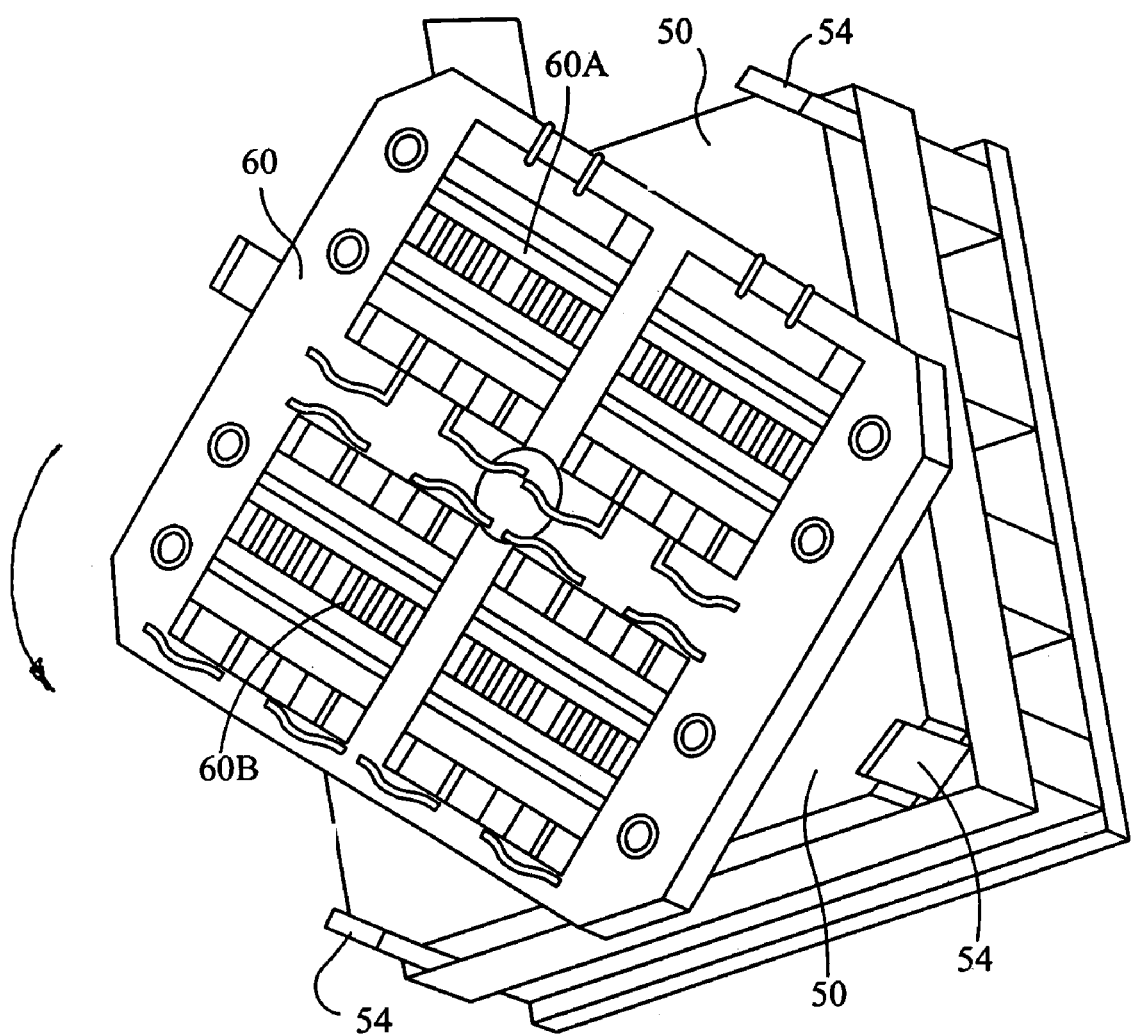
FIG. 9 is a diagrammatic representation of the relative orientation of the parts shown in FIGS. 5 through 7.

As described above, when the mold is opened to cause the upward position of the slide parts 18, the finished molded parts which have been created by both parts of the two-shot injection are ejected or removed from the mold. The central section 60 then is rotated in the direction of the arrow, as shown in FIG 9, 180° to present the other half of the mold section 60 to a position aligned with the pins 30/32 shown in FIG. 7 on the mold section 50 for subsequent opening of the mold in the manner describes above. A new set of closed sliding parts 18 are presented to this position by the rotation described below in conjunction with FIG. 9, which moves the section 60A of the mold section 60 (with closed slide parts 18) into alignment with the left-hand portion of the mold 50 shown in FIG. 7, and which moves the section 60B of the mold section 60 (with open slide parts 18) to the right-hand position, opposite the mold section 50 of FIG. 7. When the sections 50 and 60 are closed, or moved together, all of the slide parts are moved to the closed position. This is effected by mean of the differently configured slide pins 40, which are located on the right-hand side of the mold block 50, and as illustrated in FIG. 7.

Figure 4:
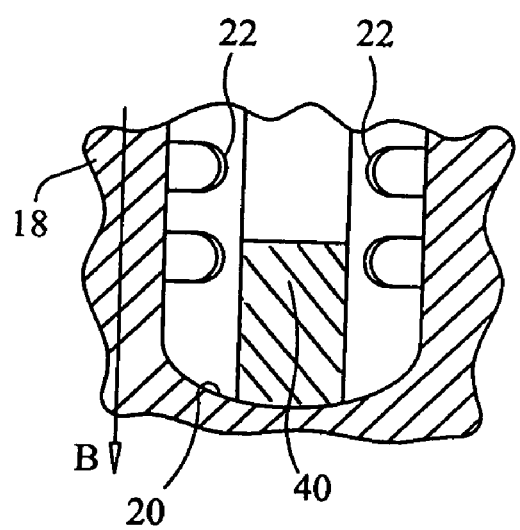
Figure 8:
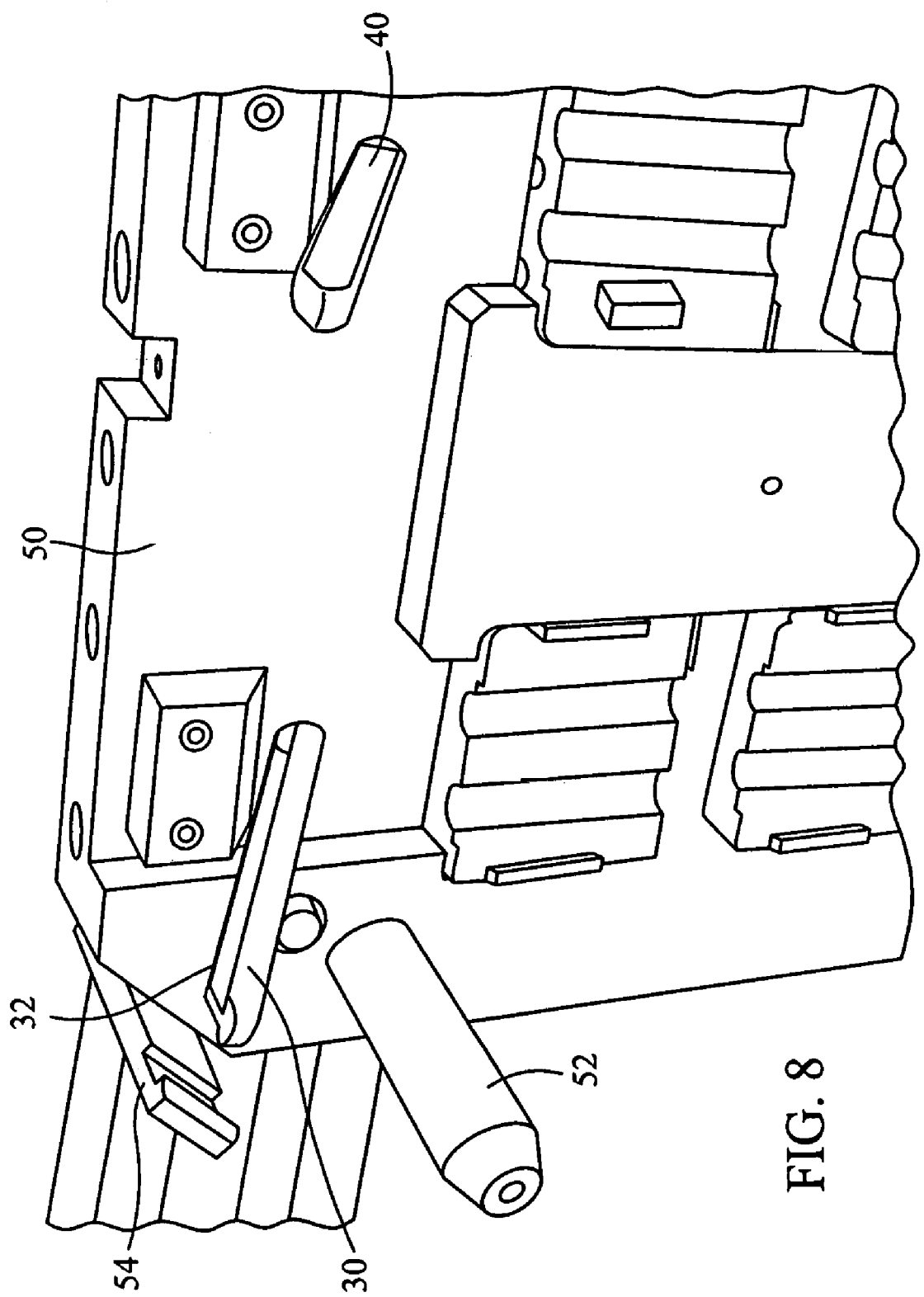
FIG. 8 is an enlargement showing details of the portion shown in FIG. 7.

As shown most clearly in FIGS. 3, 4 and 8, the pins 30/32 have the inverted T-shaped configuration described above; but the slide pins 40 are relatively narrow pins having a curved bottom, but with a width which is less than the distance between the extended cam pins 22, as illustrated in FIG. 4. Consequently, when the mold parts 50 and 60 are drawn away from one another along the axis of rotation of the rotating part 60, the pins 40 simply move out of the open upper channels 16, without engaging the cam pins 22, and therefore leave the mold slide portions 18 in the closed position. When an open slide portion is rotated into position, after the ejection of the parts through the operation described above in conjunction with FIGS. 2 and 3; the subsequent closing of the mold sections 50 and 60 causes the bottoms of the angled slide pins 40 to engage the bottoms of the channels 20 in the corresponding slide parts 18 to close those parts upon the complete engagement or closure of the central rotating mold section 60 and the relatively fixed mold section 50 when the two are closed together.

As illustrated in FIGS. 7 and 8, latch pins 54 are located on the corners of the mold section to engage corresponding latch receivers 64 (FIG. 5) on the rotating section 60 to hold the sections 50 and 60 securely together during the injection of mold material into the respective halves of the mold. After injection into both halves of the mold has taken place, the mold sections 50 and 60 are moved part, as described previously, and those aligned with the pins on the left-hand side of the mold plate 50, as shown in FIGS. 7 and 8, have the slide parts 18 opened, as described previously, while those on the right-hand side aligned with the angled cam pins 40 remain closed, since the cam pins 40 simply move out of the top of the open channels 16 without engaging any of the spring-loaded cam pins 22.

After the mold has been fully opened, the section 60 again is rotated 180° in the direction of the arrow shown in FIG. 9 to present the slide parts 18, which have received the first shot of molding material in them, in a closed position to the second shot side (the left-hand side of the plate 50 shown in FIGS. 7 and 8). This causes the first shot of material to be securely held in place in the mold to function as a mold insert for the second shot. Since the cavities in the slide parts 18 are not opened after the first shot, it is not necessary to undercut the parts to hold them in place because the closed mold cavity itself does this. This allows greater flexibility in the design of the different parts which can be made in the two-shot mold which has been described.

When the closed cavity is presented to the second shot side (the left-hand side of the mold section 50 in FIGS. 7 and 8), closure of the mold allows the cam-shaped or curved bottom of the cam pin 30/32 to simply slide past the spring-loaded cam pins 22 in the manner described previously to firmly engage the bottom 20 of the facing channel 16 to securely hold the mold closed, as is also accomplished by the slide cam pins 40 on the right-hand half of the mold section 50, as shown in FIGS. 7 and 8. The operation then continues for each subsequent 180° rotation of the central mold plate 60. Conventional alignment pins 52 in the section 50, as shown in FIG. 8, and receiving channels 62 in the section 60, as shown in FIG. 5, are employed to ensure proper alignment of the mold sections 50 and 60 during the opening and closing operation which has been described.

By the use of the two different types of angled cam pins 40 and 30/32, the push-pull relative reciprocal action of the main sections 50 and 60 of the mold also enables the selective 90° or lateral opening and closing of the slide parts 18 during each cycle of operation of the mold. This results in a simple structure which also achieves the purpose of reducing the possibility of the blemish of parts which have been formed after the first injection and prior to the second injection.

The foregoing description of an embodiment of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. In a two-shot injection mold having first and second mold sections movable between open and closed positions, the first section thereof having first and second spaced-apart sliding parts thereon, the mold including in combination: the first and second sliding parts each having an angled open top channel therein, with an angled bottom and opposing first and second sides forming a cam slide on the corresponding sliding part; at least one spring loaded protrusion extending partially into at least one of the opposite sides of each of the channels in a relaxed state thereof and depressible against spring action into the side wall of the corresponding channel; a first angled cam pin on the second mold section for engaging the bottom of the open top channel in the first sliding part when the first and second mold sections are moved from an open to a closed position and for passing outwardly through the open top of the channel without engaging the protrusion extending therein when the first and second mold sections move from a closed to an open position; a second angled cam pin spaced from the first angled cam pin on the second mold section and located to engage the bottom of the open top channel in the second sliding part when the first and second mold sections are moved from an open to a closed position, and sized to engage the corresponding protrusion to move the second sliding part perpendicularly to the movement of the first and second mold sections from a closed to a open position to open a mold cavity to facilitate removal of molded part therefrom; whereupon movement of the first and second mold sections from an open to a closed position causes the first and second angled cam pins to engage the bottoms of the corresponding channels in the first and second sliding parts to close the mold cavities in both of the first and second sliding parts.

2. An injection mold according to claim 1 wherein the bottom angled open top channels in the first and second sliding parts is curved, and the bottoms of the first and second angled cam pins have a mating configuration to the bottoms of the open top channels.

3. An injection mold according to claim 2 wherein the bottoms of the channels in the first and second sliding parts are of a curvilinear concave configuration, and the bottoms of the first and second angled cam pins are a mating convex curvilinear configuration.

4. An injection mold according to claim 3 wherein the width of the first angled cam pin is less than the distance between the spring-loaded protrusion and the opposite side of the channel, with the orientation of the first angled cam pin when the mold is opened and closed being such that the first angled cam pin passes freely through the space between the protrusion and the opposite side of the channel.

5. An injection mold according to claim 4 wherein the cross-sectional configuration of the second angled cam pin is a generally inverted T-shaped cross section.

6. An injection mold according to claim 5 wherein the generally T-shaped second angled cam pin is oriented in an inverted position, with the central leg of the T being narrower than the distance between the relaxed state of the protrusion and the opposite side of the channel to pass freely therethrough, and wherein the extensions of the T are substantially as wide as the distance between the opposite sides of the channel.

7. An injection mold according to claim 6 wherein the second mold section is oriented for relative movement with respect to the first mold section toward and away from the first mold section, and wherein the first mold section is additionally rotated about an axis which is parallel to the relative direction of movement toward and away from the second mold section; so that in a first rotational position thereof the first angled cam pin on the second mold section engages the cam slide on the first sliding part, with the second angled cam pin on the second mold section engaging the cam slide on the second sliding part, and wherein a 180° rotation of the first mold section relative to the second mold section allows the first angled cam pin on the second mold section to engage the cam slide on the second sliding part and the second angled cam pin on the second mold section to engage the cam slide on the first sliding part when the first and second mold sections are moved toward one another from an open to a closed position.

8. An injection mold according to claim 1 wherein the cross-sectional configuration of the second angled cam pin is a generally inverted T-shaped cross section.

9. An injection mold according to claim 8 wherein the generally T-shaped second angled cam pin is oriented in an inverted position, with the central leg of the T being narrower than the distance between the relaxed state of the protrusion and the opposite side of the channel to pass freely therethrough, and wherein the extensions of the T are substantially as wide as the distance between the opposite sides of the channel.

10. An injection mold according to claim 9 wherein the width of the first angled cam pin is less than the distance between the spring-loaded protrusion and the opposite side of the channel, with the orientation of the first angled cam pin when the mold is opened and closed being such that the first angled cam pin passes freely through the space between the protrusion and the opposite side of the channel.

11. An injection mold according to claim 1 wherein the bottoms of the channels in the first and second sliding parts are of a curvilinear concave configuration, and the bottoms of the first and second angled cam pins are a mating convex curvilinear configuration.

12. An injection mold according to claim 11 wherein the width of the first angled cam pin is less than the distance between the spring-loaded protrusion and the opposite side of the channel, with the orientation of the first angled cam pin when the mold is opened and closed being such that the first angled cam pin passes freely through the space between the protrusion and the opposite side of the channel.

13. An injection mold according to claim 1 wherein the second mold section is oriented for relative movement with respect to the first mold section toward and away from the first mold section, and wherein the first mold section is additionally rotated about an axis which is parallel to the relative direction of movement toward and away from the second mold section; so that in a first rotational position thereof the first angled cam pin on the second mold section engages the cam slide on the first sliding part, with the second angled cam pin on the second mold section engaging the cam slide on the second sliding part, and wherein a 180° rotation of the first mold section relative to the second mold section allows the first angled cam pin on the second mold section to engage the cam slide on the second sliding part and the second angled cam pin on the second mold section to engage the cam slide on the first sliding part when the first and second mold sections are moved toward one another from an open to a closed position.

14. An injection mold according to claim 1 wherein the width of the first angled cam pin is less than the distance between the spring-loaded protrusion and the opposite side of the channel, with the orientation of the first angled cam pin when the mold is opened and closed being such that the first angled cam pin passes freely through the space between the protrusion and the opposite side of the channel.

15. An injection mold according to claim 13 wherein the bottoms of the channels in the first and second sliding parts are of a curvilinear concave configuration, and the bottoms of the first and second angled cam pins are a mating convex curvilinear configuration.

16. An injection mold according to claim 15 wherein the cross-sectional configuration of the second angled cam pin is a generally inverted T-shaped cross section.

17. An injection mold according to claim 16 wherein the generally T-shaped second angled cam pin is oriented in an inverted position, with the central leg of the T being narrower than the distance between the relaxed state of the protrusion and the opposite side of the channel to pass freely therethrough, and wherein the extensions of the T are substantially as wide as the distance between the opposite sides of the channel.

* * * * *